United States Patent [19]

Clifton et al.

[11] Patent Number: 4,459,268
[45] Date of Patent: Jul. 10, 1984

[54] METHOD OF SEPARATING THORIUM FROM PLUTONIUM

[75] Inventors: David G. Clifton; Thomas W. Blum, both of Los Alamos, N. Mex.

[73] Assignee: The United States of America as represented by the United States Department of Energy, Washington, D.C.

[21] Appl. No.: 443,983

[22] Filed: Nov. 23, 1982

[51] Int. Cl.$^3$ ..................... C01G 56/00; C01F 15/00
[52] U.S. Cl. ......................................... 423/7; 423/251; 423/252
[58] Field of Search ........................ 423/7, 251, 252; 252/641–643

[56] References Cited

U.S. PATENT DOCUMENTS 2,865,705 12/1958 James .............................. 423/251 X
2,891,839 6/1959 Hulet .................................. 423/7 X
2,902,339 9/1959 Reber .............................. 423/251 X

OTHER PUBLICATIONS

D. B. James et al., "The Processing of Plutonium by Ion Exchange II . . . " Trans. Am. Nuc. Soc., vol. 5, No. 2, p. 459 (1962).
D. Cvjeticanin, "Separation of Np, Pu, Am, and Th by Anion Exchange", J. Chromatog., vol. 46, p. 326–328 (1970).
K. Kraus et al., "Anion Exchange Studies. XVI. Adsorption from Lithium Chloride Solutions", Comm. to the Ed. J. Am. Chem. Soc. 77, 1391 (1955).
S. V. Bagawde et al., "Complexing of Tetravalent Plutonium in Aqueous Solutions", J. Inorg. Nucl. Chem. vol. 38, pp. 1339–1345 (1976).
E. H. Taylor et al. (editors), ORNL, Chem. Div. Annual Progress Report, Jun. 20 1958, pp. 58–60.
J. M. Cleveland, *The Chemistry of Plutonium*, Gordon and Breach Science Publishers, New York (1970), p. 150.

*Primary Examiner*—Benjamin R. Padgett
*Assistant Examiner*—Virginia Caress
*Attorney, Agent, or Firm*—William A. Eklund; Paul D. Gaetjens; Michael F. Esposito

[57] ABSTRACT

A method of chemically separating plutonium from thorium. Plutonium and thorium to be separated are dissolved in an aqueous feed solution, preferably as the nitrate salts. The feed solution is acidified and sodium nitrite is added to the solution to adjust the valence of the plutonium to the +4 state. A chloride salt, preferably sodium chloride, is then added to the solution to induce formation of an anionic plutonium chloride complex. The anionic plutonium chloride complex and the thorium in solution are then separated by ion exchange on a strong base anion exchange column.

7 Claims, No Drawings

METHOD OF SEPARATING THORIUM FROM PLUTONIUM

This invention is the result of a contract with the Department of Energy (Contract No. W-7405-ENG-36).

BACKGROUND OF THE INVENTION

The present invention is generally related to chemical separation methods and, more particularly, is related to methods of separating thorium and plutonium.

The separation of thorium from plutonium has heretofore been accomplished by several methods, none of which has been altogether satisfactory.

In one process, plutonium has been separated from thorium by the method of solvent extraction, a method which is based on small differences in the respective extraction coefficients of plutonium and thorium. Multistage equipment including pulsed columns, which are expensive and complex, has been required for this process.

It has also been known to separate plutonium from thorium by a method based on anion exchange in nitric acid solutions. This method is based on small differences in distribution coefficients of plutonium and thorium and the resulting slow displacement of thorium by plutonium on the ion exchange resin. Clean-cut separation is seldom obtained because the exchange is slow and there is resulting mixing of the thorium and plutonium at the solution boundary.

It has also been known to separate plutonium from thorium by oxidation in aqueous solution of plutonium to $Pu^{+6}$, followed by precipitation and separation of the thorium as a fluoride salt, and with subsequent precipitation of the plutonium as plutonium oxalate. However, satisfactory separation by this process has not been achieved on a plant scale for several reasons, most notably because of the difficulty in maintaining the valence of the plutonium in the +6 state. Failure to maintain the plutonium valence in the +6 state results in partial precipitation of the plutonium with the thorium. Also, complete precipitation of the thorium fluoride is difficult to obtain routinely, resulting in contamination of the plutonium with thorium.

Another method that has been previously known, and which is most closely related to the method of the present invention, is based upon chloride anion exchange from concentrated hydrochloric acid (HCl) solution. This method gives good separation but produces voluminous corrosive HCl fumes, thus requiring off-gas scrubbing to prevent corrosion of the various pieces of equipment and fume hoods which are normally used in the handling of plutonium.

SUMMARY OF THE INVENTION

Accordingly, it is the object and purpose of the present invention to provide a method of chemically separating plutonium from thorium.

It is also an object and purpose of the present invention to provide a method of separating plutonium and thorium which does not generate corrosive hydrochloric acid fumes, thereby reducing the cost and difficulty of handling the plutonium.

It is another object of the invention to provide a relatively simple yet efficient method of separating thorium from plutonium, which can be implemented on a plant scale.

To achieve the foregoing and other objects, and in accordance with the broad purposes of the present invention as embodied and broadly described herein, the method of the present invention comprises the steps of forming an aqueous feed solution containing plutonium and thorium to be separated, acidifying the feed solution and adjusting the valence of the plutonium therein with sodium nitrite, forming an anionic plutonium chloride complex by addition of a chloride salt, preferably sodium chloride, to the feed solution, and separating the thorium in solution from the anionic plutonium chloride complex by anion exchange on a strong base ion exchange resin. These and other aspects of the invention will be apparent to one of ordinary skill in the art upon consideration of the following detailed description of the preferred embodiment.

DETAILED DESCRIPTION OF THE PREFERRED EMBODIMENT

In accordance with the preferred embodiment of the method of the invention, an aqueous feed solution is prepared containing plutonium at a concentration of 10 to 25 grams per liter, preferably as the nitrate salt, and thorium at any concentration up to several times the plutonium concentration. The feed solution is acidified, preferably with nitric acid, to an acidity of 0.8 to 1.0 normal. This acidification is for the purpose of preventing hydrolysis of $Pu^{+4}$ as well as $Th^{+4}$. To the acidified feed solution is added sodium nitrite to a concentration of approximately 3.5 grams per liter to adjust the plutonium valence state to the +4 state. The use of sodium nitrite in this manner prevents the reduction of $Pu^{+4}$ to $Pu^{+3}$. An alkali chloride, preferably sodium chloride, is then added to the feed solution to a concentration of approximately 4.8 to 5.0 molar to complex the plutonium in solution as the anionic $PuCl_6^{-2}$ complex, as well as other possible anionic plutonium chloride complexes which are as yet not completely ascertained. Thorium in the feed solution does not form appreciable amounts of any chloride complex, and thus exists simply as aqueous $Th^{+4}$.

Sodium chloride is most desirable for the purpose of forming the $PuCl_6^{-2}$ complex because the solubilities of other alkali chlorides that might be used are not as high as that of sodium chloride. The alkali earth chlorides, such as $CaCl_2$ or $MgCl_2$, are generally not as suitable because the alkali earth metals form insoluble hydroxides in a downstream neutralization step of the process, which is described further below.

The feed solution prepared as described above is passed through a strong base anion exchange resin. One commercially available resin suitable for this step is sold by Dow Chemical Co. under the product name Dowex 1×4, which is a 50-100 mesh resin. The resin is preconditioned to ensure that it is in the chloride form by equilibrating it with a solution of 2 N HCl and subsequently washing it with distilled water.

The feed solution is passed through the ion exchange resin, preferably at a rate of approximately 0.8 to 0.9 ml/min-cm$^2$. The $PuCl_6^{-2}$ complex is absorbed on the resin and is visible as a dark brown band which spreads progressively downward through the column. The plutonium-loaded column is then washed with an acidified NaCl solution to remove residual thorium from the column, without also removing the absorbed $PuCl_6^{-2}$.

The effluent solution collected from the resin column, which is largely depleted of plutonium but not thorium, is neutralized with an alkaline solution, preferably 9 M NaOH, to cause the thorium to precipitate out as white thorium hydroxide (Th(OH)$_4$). If desired, the effluent solution may be passed through another anion exchange column to further remove any traces of plutonium that may still be present. In this regard, the effluent solution collected from the column may be periodically tested for thorium by adding a few drops of concentrated NaOH solution to small grab samples of the effluent solution; the presence of thorium in the sample is indicated by cloudiness upon mixing of these solutions. Ordinarily the thorium hydroxide precipitate is sufficiently low in plutonium as to permit it to be dried and discarded as low level waste, or recycled and reprocessed as desired to further recover and purify the thorium.

After the thorium has been thoroughly washed from the column and collected as described above, the plutonium absorbed on the column is eluted by washing the column with approximately two column volumes of an acid solution, preferably 0.5 N HCl. HCl is preferred in this step because it leaves the column ready for reuse in the chloride form. As the eluted solution is collected from the column it is neutralized, and the plutonium in solution is precipitated as plutonium hydroxide by addition of a NaOH solution. The plutonium hydroxide precipitate may be collected by filtration and the filtrate may be discarded as low level caustic waste. The plutonium hydroxide precipitate may be dried and calcined to form plutonium oxide, or it may be dissolved in nitric acid and further processed as an aqueous nitrate solution.

EXAMPLE

In a demonstration of the method described above, a feed solution was prepared containing 20.4 gm/l plutonium as plutonium nitrate and 11.4 gm/l thorium, also as the nitrate. This solution was acidified with nitric acid (HNO$_3$) to an acidity of 0.9 normal. Sodium nitrite (NaNO$_2$) was added to the solution to a concentration of 0.03 molar to adjust the valence of the plutonium at the +4 state, and sodium chloride (NaCl) was then added up to a concentration of 4.8 molar to complex the stabilized Pu$^{+4}$ as the PuCl$_6^{-2}$ complex.

A 65.5 ml aliquot of the feed solution thus prepared was then loaded onto an ion exchange column consisting of 12 gm (dry weight) of chloride form Dowex 1×4 strong base resin packed between two glass wool plugs in a 100 ml burette having a cross-sectional area of 1.767 cm$^2$. The resin was wetted with distilled water and then loaded with one column volume of a HNO$_3$-NaCl wash solution.

The aliquot of feed solution was allowed to pass through the column at a rate of 1.35 to 1.65 milliliters per minute. As the solution passed through the column a dark brown band formed at the top of the column and gradually spread downwardly until it covered approximately three quarters of the column.

A total effluent volume of 65.5 ml (the same as the volume of feed solution originally added to the column) was collected from the column. This effluent solution was neutralized with 9 M NaOH solution, which caused thorium hydroxide to precipitate as a finely divided white precipitate. A sample of the precipitate was dissolved and analyzed and determined to contain 0.0627 gm/l Pu and 3.2 gm/l Th.

The column was then washed with three column volumes of a wash solution containing 1.0 N HNO$_3$ and 4.8 M NaCl, which was passed through the column at a rate of 1.0 ml/min-cm$^2$. The effluent wash solution was periodically tested for the presence of thorium by addition of a few drops of concentrated NaOH solution to small grab samples collected from effluent discharging from the column. The presence of thorium was initially indicated by cloudiness due to the formation of thorium hydroxide. No thorium was indicated after washing with the three column volumes mentioned above.

The plutonium was then eluted from the column with 0.5 N HCl. The eluate solution was neutralized with a NaOH solution to precipitate the plutonium as plutonium hydroxide, which was collected by filtration and washed with 0.1 N NaOH solution. The collected plutonium was analyzed and determined to contain 1200 parts per million (ppm) thorium. Subsequent similar experiments have consistently given plutonium products with thorium contamination levels of less than 300 parts per million.

The foregoing description of the preferred embodiment of the invention have been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of chemically separating plutonium from thorium, comprising the steps of:
   forming an aqueous feed solution containing the nitrate salts of plutonium and thorium to be separated;
   acidifying said feed solution to an acidity of between approximately 0.8 to 1.0 normal:
   adjusting the valence of the plutonium in said solution to the +4 state by adding sodium nitrite to said solution;
   forming an anionic chloride complex of the plutonium in said solution by adding an alkali chloride salt to said feed solution to a concentration of approximately 4.8 to 5.0 molar; and
   separating the thorium in said feed solution from the anionic plutonium chloride complex in said solution by anion exchange chromatography using a strong base anion exchange resin.

2. The method of claim 1 wherein said alkali chloride salt is sodium chloride.

3. The method of claim 2 wherein said feed solution is acidified by addition of nitric acid to said feed solution.

4. The method defined in claim 3 wherein said feed solution is prepared from a nitric acid solution approximately 6 N in HNO$_3$ and containing plutonium nitrate at a concentration of between approximately 100 to 200 grams per liter and thorium nitrate at a concentration of up to several times the plutonium concentration, and wherein said nitric acid solution containing plutonium and thorium is diluted with a second nitric acid solution approximately 0.1 N in HNO$_3$ until the acidity of said feed solution is approximately 1.0 N in HNO$_3$.

5. The method defined in claim 1 wherein said thorium is separated from said anionic plutonium chloride complex by passing said feed solution through a chloride-treated anion exchange column, washing said column with an acid wash solution containing approximately 4.8 to 5.0 M NaCl to remove thorium from said column, and subsequently eluting the plutonium from said column by washing said column with an HCl solution.

6. The method defined in claim 5 wherein said HCl solution, is approximately 0.5 N in HCl.

7. The method defined in claim 5 comprising the additional step of collecting the plutonium and thorium from their respective eluate solutions by precipitation as the hydroxide and subsequent separation from the supernatant solution by filtration.

* * * * *